No. 649,549. Patented May 15, 1900.
H. F. ROACH.
ELECTRIC LIGHT SYSTEM.
(Application filed June 23, 1899.)
(No Model.)
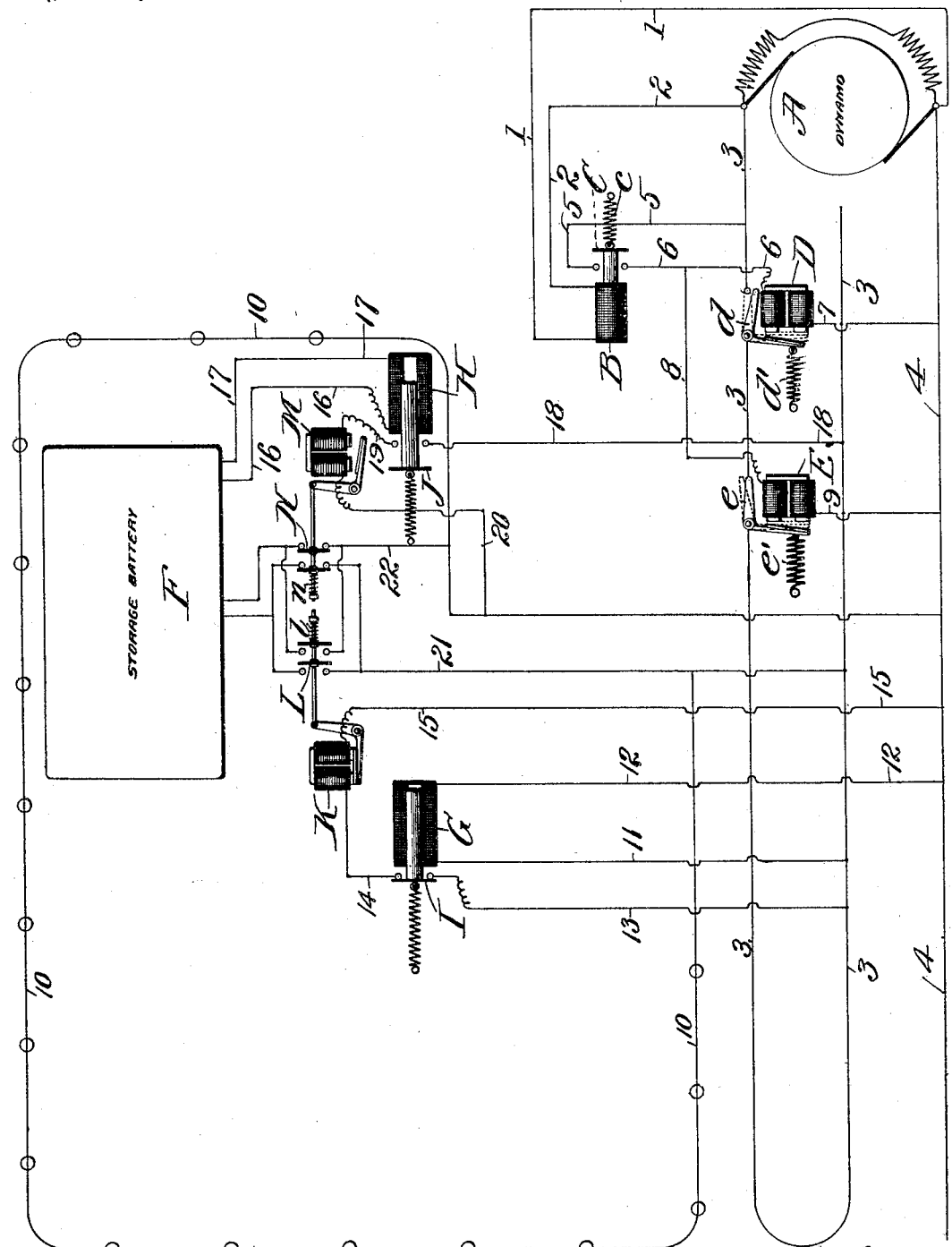
Attest:
Wm H Scott
A. S. Gray.
Inventor:
Harry F. Roach
by Bakewell & Cornwall
Attys.

UNITED STATES PATENT OFFICE.

HARRY F. ROACH, OF ST. LOUIS, MISSOURI.

ELECTRIC-LIGHT SYSTEM.

SPECIFICATION forming part of Letters Patent No. 649,549, dated May 15, 1900.

Application filed June 23, 1899. Serial No. 721,571. (No model.)

*To all whom it may concern:*

Be it known that I, HARRY F. ROACH, a citizen of the United States, residing at the city of St. Louis, in the State of Missouri, have invented a certain new and useful Improvement in Electric-Light Systems, of which the following is a full, clear, and exact description, such as will enable others skilled in the art to which it appertains to make and use the same, reference being had to the accompanying drawing, forming part of this specification.

This invention relates to a new and useful improvement in electric-light systems; and it consists in the construction, arrangement, and combination of the several parts, all as will hereinafter be described and afterward pointed out in the claims.

The objects of the present invention are to run an electric-light or other system from the dynamo or other source of power, in which system is arranged a storage battery or batteries which are charged from the dynamo under certain conditions, the separate battery acting to supply the system when the dynamo fails to give the required voltage.

In the accompanying drawing the figure illustrates in diagram a conventional system in which are arranged the several part constituting my invention.

A indicates a dynamo, which may be of any approved construction, and B a magnet constantly in the dynamo-circuit, which magnet may be in the form of a solenoid to act as a circuit making and breaking device C in one direction, a spring $c$ opposing the solenoid. The circuit making and breaking device is so arranged and adjusted that it closes its circuit whenever the dynamo reaches or exceeds a predetermined voltage, below which point the circuit is automatically open. The circuit which is controlled by the circuit maker and breaker C includes two magnets or solenoids D and E, whose armatures have connected to them switches $d$ and $e$, respectively, which are held away from the magnets by springs $d'$ and $e'$. Both switches $d$ and $e$ are in the main line, the former being normally in such position when the dynamo is not running or has a low voltage as to keep the main-line circuit broken, while the latter is designed, under the same conditions, to keep the main-line circuit closed.

The wires leading to and from the several parts heretofore referred to may be briefly described as follows: 1 indicates a supply-wire leading from the dynamo to magnet B, and 2 return-wire from said magnet to the other pole of the dynamo; 3, the main-line supply-wire leading from the dynamo; 4, main-line return-wire of dynamo; 5, wire leading from main-line supply-wire to terminal in the path of contact maker and breaker C; 6, wire leading from terminal in path of contact maker and breaker to magnet D, and 7 wire leading from said magnet to return-wire 4; 8, wire leading from terminal in path of contact maker and breaker C to magnet E, and 9 wire from said magnet to return-wire 4. 10 is the lamp-circuit, connected with the main supply and return wires of the dynamo.

In operation the system above described is so constructed and arranged that the lamp-circuit will be supplied from the dynamo only when said dynamo yields a voltage between certain points fixed by the magnets D and E. Assuming, for purposes of illustration, that magnet D will throw its switch when the voltage supplied from the dynamo reaches or exceeds one hundred and twenty volts and that magnet E will throw its switch when the voltage from the dynamo reaches or exceeds one hundred and thirty volts, the springs connected to the respective switches returning them to their normal position when the voltage is lower than that above stated, as the magnet B of the circuit making and breaking device is constantly in the dynamo-circuit it will be operated when the voltage of the dynamo reaches a certain point—say one hundred and fifteen volts. The contact maker and breaker will now complete circuits through the magnets D and E; but the voltage being lower than what is required to operate the minor magnet the main-line wire to the lamp-circuit will still be broken on account of the switch $d$. When the voltage reaches one hundred and twenty, magnet D will attract its armature and so throw the switch $d$, so as to complete the main-line circuit of the dynamo and so feed the lamp-circuit. Should the dynamo continue building up, it will upon reaching one hundred and thirty volts cause the magnet E to attract its armature and so throw the switch $e$ as to break the main-line supply to the lamp-circuit, and thus cut out the dynamo.

From the above it will be seen that the control of the lamp-circuit from the dynamo is self-regulating and fixed between certain points, beneath or above which the dynamo will be automatically cut out.

I will now describe the manner in which I employ a storage battery in connection with my improved system, whereby the same can be relied upon to supply the lamp-circuit in the event that the dynamo is cut out, said storage battery being charged by the dynamo.

F indicates the storage battery, which may be of any ordinary or approved construction.

G indicates a magnet which is energized from the dynamo-circuit.

H indicates a magnet which is energized from the battery-circuit.

Magnets G and H operate the circuit makers and breakers I and J, respectively, the former of which completes a circuit through magnets K from the dynamo-circuit. Magnets K control a switch L, which is normally held in engagement with battery-terminals by a spring $l$.

Magnet H in operating the circuit maker and breaker J completes a circuit through magnets M, which control switch N, said switch being normally held in engagement with the battery-terminals by a spring $n$. Wires leading to these various magnets and terminals may be briefly described as follows: Wire 11 leads from main supply-wire to magnet G, and wire 12 connects said magnet with the return-wire. Wire 13 leads from dynamo supply-wire to terminal in the path of circuit-maker I, and wire 14 from terminal in the path of said circuit-maker to magnets K, which are connected by wire 15 to main-line return-wire. 16 leads from battery to magnet H, and 17 from said magnet back to battery. 18 leads from main-line supply to terminal in front of circuit-maker J, 19 from the other terminal in the path of said circuit-maker to magnets M, and 20 from said magnets to the main-line return-wire. 21 leads from battery to terminals in the path of switches L and N, and 22 leads back to terminals in the path of switches L and N and back to battery. Both wires 21 and 22 are connected, respectively, to the main-line supply-wire and to the main-line return-wire. The operation of this part of my system is as follows: Assuming that the dynamo is just starting and that it is desired to charge the storage battery and at the same time operate the lamp-circuit, when the voltage reaches a predetermined point, as heretofore described, the magnet D will cut in the main line, and as the switches L and N remain normally closed by their respective springs the battery will be charged until its circuit through the magnet H throws the switch N to disengage the battery from the main-line circuit when said battery has been charged to the required amount. The magnet G in the main-line circuit will have before this operated to throw the switch L away from its terminals, with the result that the battery-circuit will now be entirely disconnected from the main line. Should the dynamo-circuit fall below or go above predetermined points, as heretofore described, with the result that magnets D or E operate to open the circuit, the magnet G will thereupon be deënergized, with the result that it will break the circuit to magnets K and permit the spring $l$ to force the switch L to close the battery-circuit, so that the lamp-circuit will be supplied from the battery. Should the battery-circuit fall below a predetermined point, the armature of the solenoid H will yield to the pull of its spring, with the result that the circuit, including the magnets M, will be open, so that the switch N will be closed to recharge the battery from the dynamo-circuit.

My system is designed particularly for use in connection with dynamos which are run at variable speeds, such as dynamos which are driven from the driving mechanism or axle of a locomotive or car, and provision has to be made, therefore, to accommodate the variation in the voltage emanating from the dynamo; but it will be obvious that the system is also applicable under other conditions than those above mentioned.

Having thus described my invention, what I claim, and desire to secure by Letters Patent, is—

1. The combination with a dynamo and its circuit, of a magnet which is constantly energized by said circuit, a circuit maker and breaker controlled by said magnet for making and breaking a circuit auxiliary to the main dynamo-circuit, and circuit makers and breakers which are energized from said auxiliary circuit for making and breaking the main-line circuit, said circuit makers and breakers being designed to act at different pressures; substantially as described.

2. The combination with a dynamo and its main-line circuit, of a circuit maker and breaker which is constantly energized by said dynamo-circuit, an auxiliary circuit which is made and broken by said circuit maker and breaker, and circuit makers and breakers for the main-line circuit which are energized by said auxiliary circuit, one of said circuit makers and breakers, namely, keeping the main-line circuit open and closing it when energized and the other circuit maker and breaker normally keeping the main circuit closed and opening it when energized; substantially as described.

3. The combination with a dynamo and its main circuit, of a storage battery and its main circuit which is connected with the main dynamo-circuit, a circuit maker and breaker which is energized by an independent circuit from the dynamo, a circuit maker and breaker which is energized by an independent circuit from the storage battery and which controls the making and breaking of the main storage-battery circuit, a circuit maker and breaker which controls the making and breaking of the main dynamo-circuit, and an auxiliary circuit governing said last-named circuit-breaker which is controlled by the circuit maker and breaker in the independent circuit from the dynamo.

4. In a system of the class described, a main or dynamo circuit, automatic circuit makers and breakers controlling said circuit to keep it within predetermined limits, a storage battery in a main circuit with the dynamo-circuit, a circuit-breaker controlling the battery-circuit, a circuit maker and breaker in an independent circuit from the storage battery and an auxiliary circuit for operating the circuit-breaker of the main circuit of the storage battery which is controlled by the circuit-breaker of the auxiliary circuit.

5. In a system of the class described, a main or dynamo circuit automatic circuit makers and breakers controlling said circuit to keep it within predetermined limits, a storage battery in a main circuit with the dynamo-circuit, independent normally-closed circuit-breakers controlling said main battery-circuit, independent circuits fed by the dynamo-circuit having means for opening the respective circuit-breakers aforesaid and independent circuit-breakers controlling said circuits, one of which is energized by the dynamo-circuit and the other by an auxiliary circuit from the storage battery.

In testimony whereof I hereunto affix my signature, in the presence of two witnesses, this 20th day of June, 1899.

HARRY F. ROACH.

Witnesses:
F. R. CORNWALL,
WM. H. SCOTT.